US006002494A

United States Patent [19]
Tabata

[11] Patent Number: 6,002,494
[45] Date of Patent: Dec. 14, 1999

[54] IMAGE READING APPARATUS HAVING LIGHT SOURCE ELECTRICALLY AND DIRECTLY CONNECTED TO IMAGE SENSOR BOARD

[75] Inventor: Masami Tabata, Isehara, Japan

[73] Assignee: Canon Kabushiki Kaisha, Tokyo, Japan

[21] Appl. No.: 08/795,636

[22] Filed: Feb. 6, 1997

[30] Foreign Application Priority Data

Feb. 9, 1996 [JP] Japan .................................. 8-024341
Jan. 22, 1997 [JP] Japan .................................. 9-009384

[51] Int. Cl.$^6$ ................................................ H04N 1/04
[52] U.S. Cl. ......................... 358/475; 358/483; 358/509
[58] Field of Search ................................. 358/475, 509,
358/483, 482, 474, 471, 484, 473, 496,
498, 296; 250/208.1, 234, 235, 236; 362/800,
231, 543–545; 399/221, 220; 257/80, 88,
81, 99

[56] References Cited

U.S. PATENT DOCUMENTS

| | | | |
|---|---|---|---|
| 4,996,606 | 2/1991 | Kawai et al. ............................. | 358/475 |
| 5,019,897 | 5/1991 | Shirata et al. ............................ | 358/509 |
| 5,270,840 | 12/1993 | Ogata et al. ............................ | 358/482 |
| 5,331,433 | 7/1994 | Sato ........................................ | 358/483 |
| 5,418,384 | 5/1995 | Yamana et al. ........................... | 257/88 |
| 5,434,682 | 7/1995 | Imamura et al. ......................... | 358/483 |
| 5,477,329 | 12/1995 | Imamura et al. ......................... | 358/482 |
| 5,579,114 | 11/1996 | Imamura et al. ......................... | 358/484 |
| 5,780,840 | 7/1998 | Lee et al. ................................ | 358/482 |

Primary Examiner—Edward L. Coles
Assistant Examiner—Cheukfan Lee
Attorney, Agent, or Firm—Fitzpatrick, Cella, Harper & Scinto

[57] ABSTRACT

An image reading apparatus includes a sensor IC having a group of photoelectric conversion devices which are linearly aligned, a sensor board on which the sensor IC is mounted, a lens for forming light information into an image on the sensor IC, a light source having electrical connection lines, an illumination unit consisting of a light guide for guiding light from the light source and outputting the light in a desired direction, and a frame for holding the respective members. The electrical connection lines of the light source are directly connected to the sensor board. Connector cables for the light source can be omitted, and the image sensor and the external system can be electrically connected through one connector. By simplifying the electrical connection, the influence of noise can be minimized.

167 Claims, 8 Drawing Sheets

IMAGE READING APPARATUS HAVING LIGHT SOURCE ELECTRICALLY AND DIRECTLY CONNECTED TO IMAGE SENSOR BOARD

BACKGROUND OF THE INVENTION

1. Field of the Invention

The present invention relates to an image reading apparatus such as a scanner or a facsimile apparatus.

2. Related Art

Figure 1:
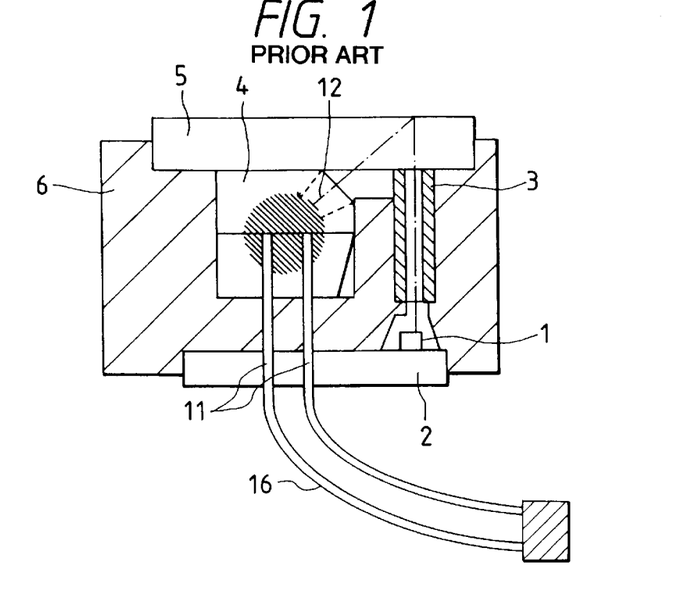
FIG. 1 is a sectional view of an image sensor of a related art.
Figure 2:
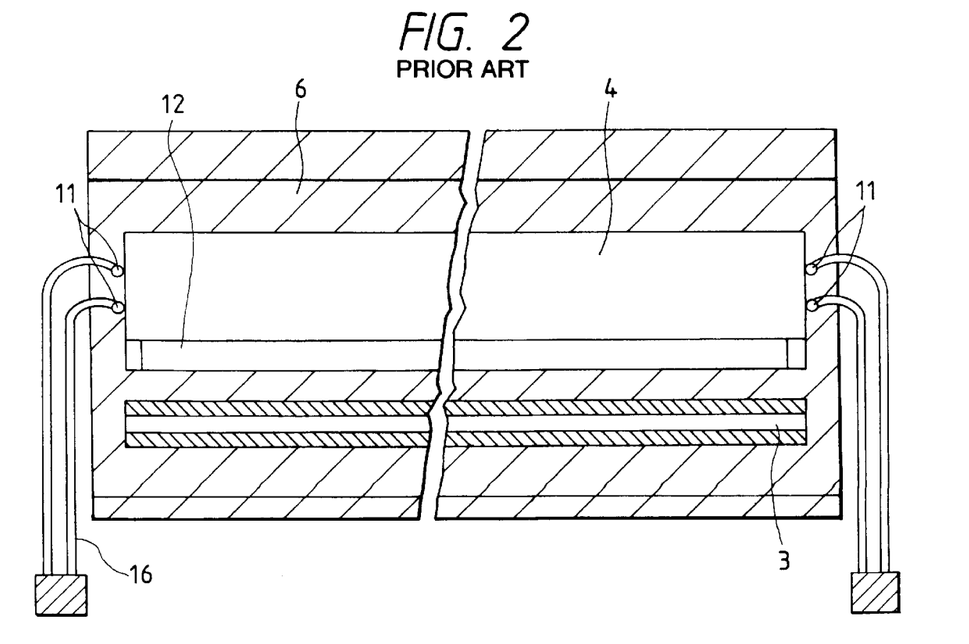
FIG. 2 is a plan view of the image sensor of the related art.

As shown in the sectional view of FIG. 1 and the plan view of FIG. 2, an image sensor used in an original reading apparatus comprises a sensor IC 1, a sensor board 2 on which the sensor IC 1 is mounted, a lens array 3, an illumination unit 4, a cover glass 5, and a frame 6 for positioning/holding these members. The illumination unit 4 comprises lead frame type LEDs 7 serving as light sources, a light guide 8, and a housing 9 for positioning/holding the LEDs 7 and the light guide 8.

Figure 3A:
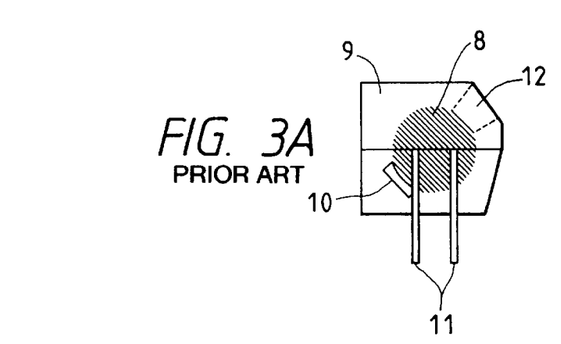
FIGS. 3A and 3B are sectional and side views, respectively, showing an illumination unit of the related art.
Figure 3B:
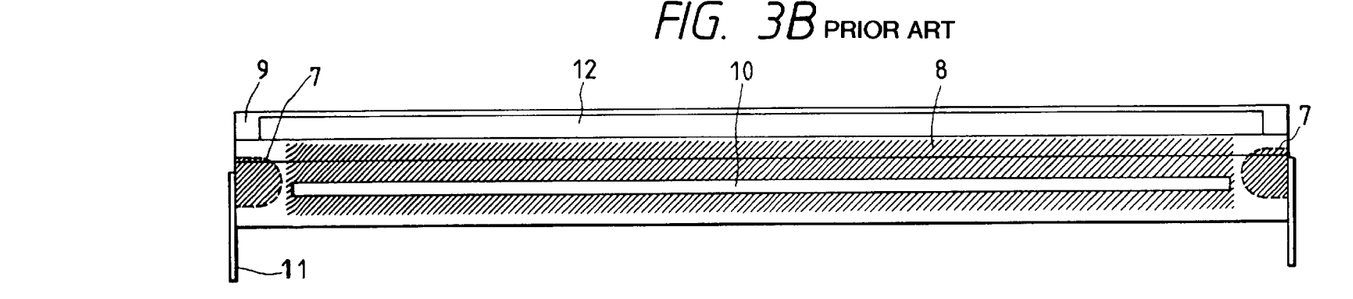

FIGS. 3A and 3B are sectional and side views, respectively, showing the detailed structure of the illumination unit 4. Referring to FIGS. 3A and 3B, the illumination unit 4 is constituted by the lead frame type LEDs 7 serving as light sources, the columnar light guide 8 consisting of a transparent member of, e.g., an acrylic resin, and the housing 9 which has a hexagonal section to position/hold the LEDs 7 and the light guide 8.

Figure 4:
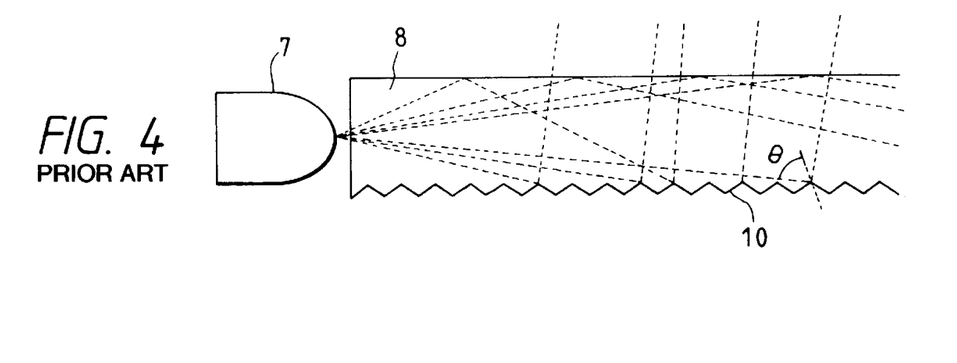
FIG. 4 is a view showing the details of the illumination unit of the related art.

The LEDs 7 are arranged at the two ends of the light guide 8 such that light beams are incident into the light guide 8. The light guide 8 has a diffusion surface 10. Fine tapered portions are continuously formed on the diffusion surface 10 along the longitudinal direction of the light guide 8, as shown in FIG. 4. A light beam incident on this tapered portion at an incident angle θ of 41° or more (when the light guide 8 consists of an acrylic resin and has a refractive index n of 1.5) satisfies the total reflection angle condition so that the light beam emerges in a desired direction.

The housing 9 for positioning/holding the LEDs 7 and the light guide 8 has, on a surface corresponding to one of the six sides of its hexagonal section, a slit 12 for passing light in the exit direction. To ensure a light amount, the light guide 8 preferably has a white-based color with a high light reflection efficiency. The light guide 8 is formed of, e.g., an ABS resin.

The LEDs 7 are electrically connected to an external system through connector cables 16. Since two LEDs 7 sandwich the light guide 8, two connector cables 16 are necessary.

In the above prior art, the LEDs 7 are electrically connected to the external system through the connector cables 16. For this reason, the following problems are posed.

(1) The number of connector cables 16 equal the number of LEDs 7. The cost of the connector cables 16 and an increase in labor for attaching the connector cables 16 to leads 11 of the LEDs 7 result in an increase in cost.

(2) Electrical connection between the image sensor and the external system is complex and therefore easily affected by noise.

(3) A predetermined illuminance on the original read line can hardly be obtained because no luminance adjusting circuit for the LEDs 7 can be inserted between the LEDs 7 and the external system. For this reason, a sensor output ("bright" sensor output) in reading, e.g., a white original largely varies between image sensors as end products.

SUMMARY OF THE INVENTION

It is an object of the present invention to enable high-quality image read processing.

It is another object of the present invention to provide an image reading apparatus having a high mechanical strength.

It is still another object of the present invention to achieve cost and size reduction of an image reading apparatus.

It is a further object of the present invention to minimize variations in read outputs.

In order to achieve the above objects, according to an aspect of the present invention, there is provided an image reading apparatus comprising a light source for irradiating a target object, a sensor IC having a photoelectric conversion device for converting light information from the target object irradiated by the light source into an image signal, a sensor board separated from the light source and mounted with the sensor IC, a frame which incorporates the light source, and fixing means for fixing a lead member from the light source to the sensor board and fixing the sensor board to the frame.

With this arrangement, a sufficient mechanical strength can be ensured while achieving size and cost reduction of the apparatus. In addition, variations in read outputs can be suppressed, so that a high-quality image can be read.

Other features, objects and advantages of the present invention will be apparent from the following specification in conjunction with the accompanying drawings.

DETAILED DESCRIPTION OF THE PREFERRED EMBODIMENTS

Image sensors according to preferred embodiments of the present invention will be described below with reference to the accompanying drawings.

Figure 5:
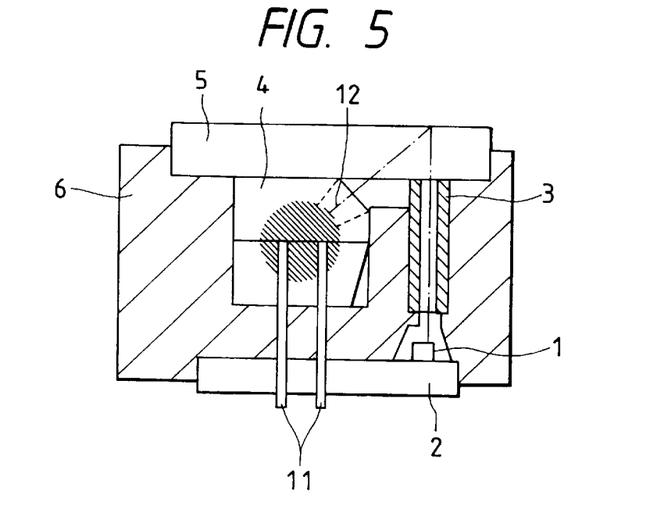
FIG. 5 is a sectional view of an image sensor according to the first embodiment.
Figure 6:
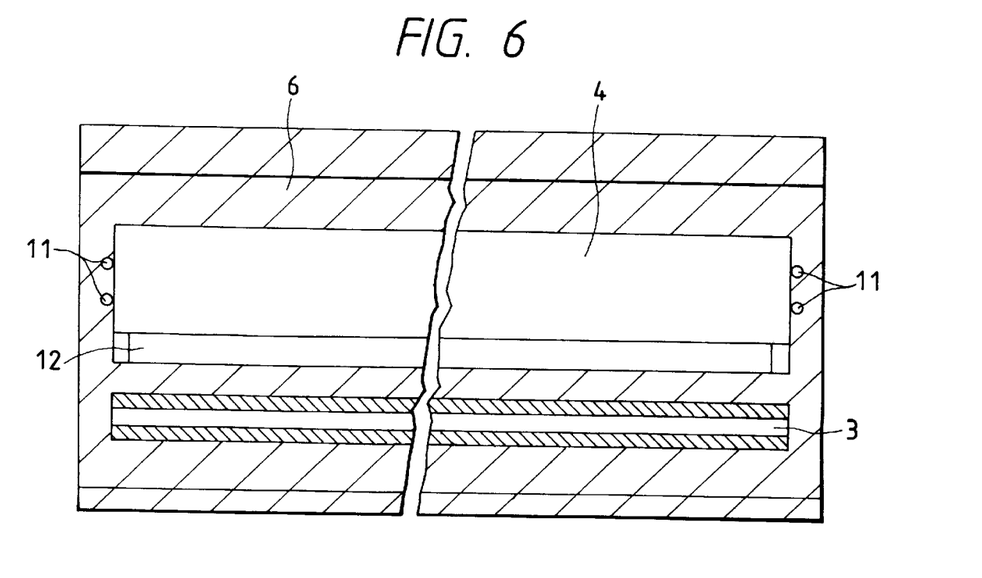
FIG. 6 is a plan view of the image sensor according to the first embodiment.
Figure 7:
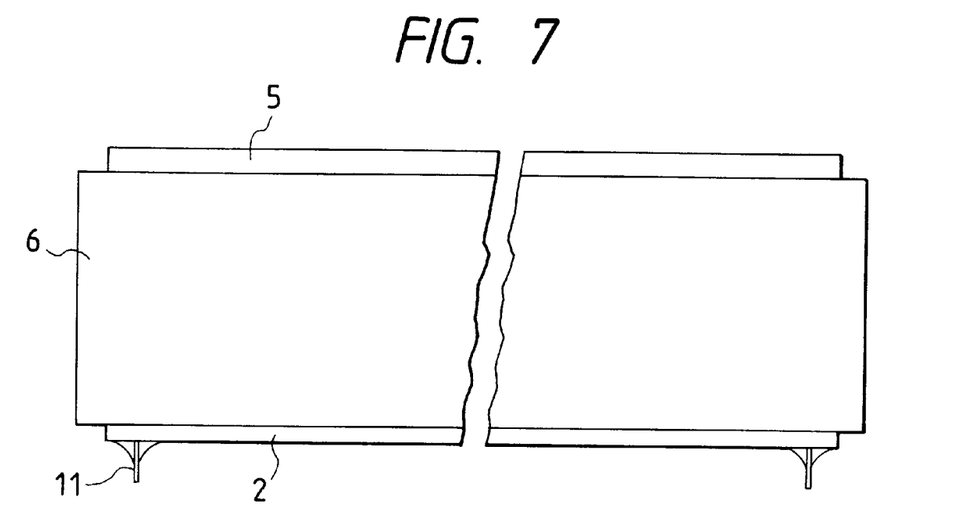
FIG. 7 is a side view of the image sensor according to the first embodiment.

FIGS. 5 to 7 are sectional, plan, and side views, respectively, showing an image sensor according to the first embodiment. This image sensor comprises a sensor array constituted by precisely aligning, on a sensor board 2 consisting of, e.g., a glass epoxy resin, a plurality of sensor ICs 1 having a linear photoelectric conversion device group as a line corresponding to the length of a target read original, a lens array 3, an illumination unit 4, a cover glass 5 consisting of a transparent member for supporting the original, and a frame 6 which is formed of a metal such as aluminum or a resin such as polycarbonate to position/hold these members.

The functions of the respective members will be described. The illumination unit 4 obliquely illuminates an original supported by the cover glass 5, with light at an angle of about 45°. Light information from the original is formed into an image on the sensor IC 1 through the lens array 3. The sensor IC 1 converts the light information into an electric signal and transmits the electric signal to the system.

The illumination unit 4 basically has the same arrangement as that shown in FIG. 4. Two leads 11 extend from LEDs 7 arranged at the two ends of the illumination unit 4.

A method of manufacturing the image sensor of the first embodiment will be described next.

The lens array 3 and the illumination unit 4 are inserted to predetermined positions of the frame 6. When three surfaces of a housing 9, which correspond to three of the six sides of the hexagonal section, are caused to abut against the horizontal and vertical surfaces of the frame 6, the optical axis of the illumination unit 4 can be precisely positioned in the rotational direction.

Next, as shown in FIG. 5, the upper surface of the illumination unit 4 and that of the lens array 3, which are inserted into the frame 6, approximately form a plane together with the cover glass 5 mounting portion of the frame 6. The cover glass 5 is placed on this plane and bonded, with, e.g., an adhesive, to two surfaces of the frame 6, which are set to sandwich the illumination unit 4 and the lens array 3 along the longitudinal direction. The upper surface of the illumination unit 4 approximately parallelly contacts the surface of the cover glass 5 because the upper surface of the illumination unit 4 is a horizontal surface. Therefore, by bonding the frame 6 to cover glass 5, as described above, the illumination unit 4 can be simultaneously firmly fixed.

Figure 8:
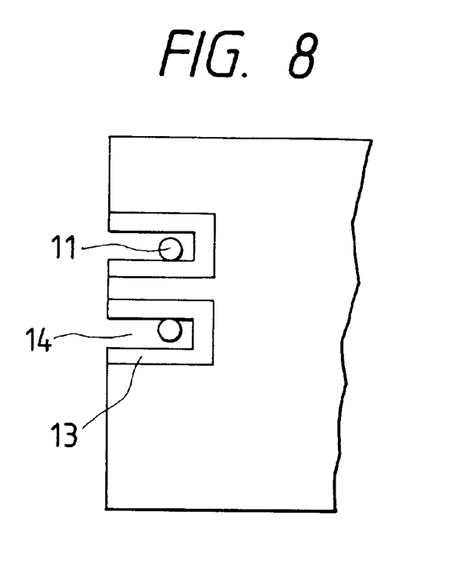
FIG. 8 is a view showing the details of the end portion of a sensor board according to the first embodiment.
Figure 9:
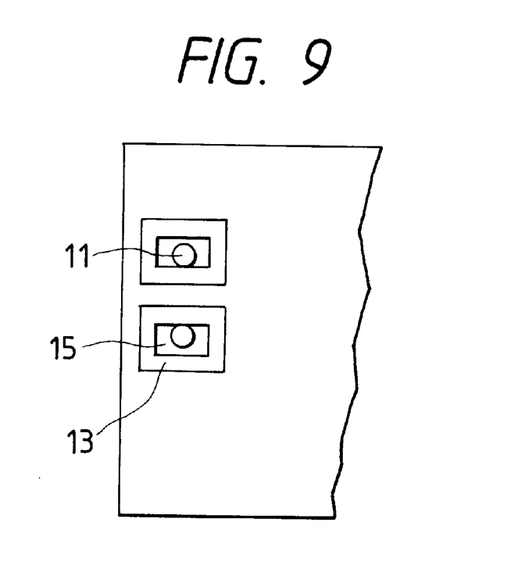
FIG. 9 is a view showing the details of the end portion of the sensor board according to the first embodiment.

The sensor array is inserted into the frame 6. As shown in FIG. 8 or 9, gaps 14 (FIG. 8) or through holes 15 (FIG. 9) are formed in the sensor board 2 of the sensor array at positions or portions corresponding to the leads 11 of the LEDs 7, i.e., at the end portions of the sensor board 2. The leads 11 of the LEDs 7 are bent into an almost L shape and inserted into these gaps 14 or through holes 15. After insertion of the leads 11, the leads 11 are soldered to solder lands 13 formed around the gaps 14 or through holes 15 to fix the sensor board 2 to the frame 6, thereby completing the image sensor.

As shown in FIG. 8 or 9, the gaps 14 or through holes 15 are independently formed in correspondence with the anodes and cathodes of the leads 11 of the LEDs 7. With this arrangement, an electrical short circuit between the leads 11 of the LEDs 7 can be prevented. In addition, when through hole plating is performed for the section of the gap 14 or through hole 15 of the sensor board 2, the soldering strength can be increased.

Figure 10:
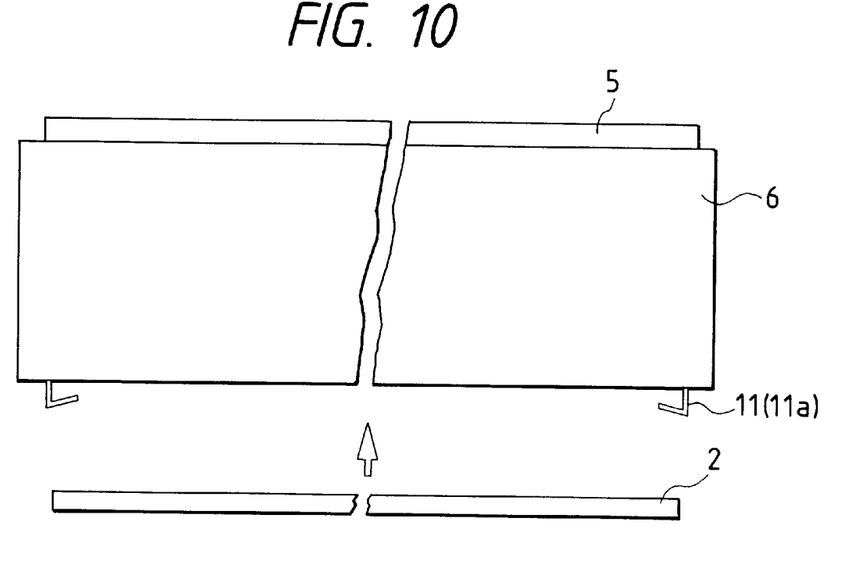
FIG. 10 is a side view of an image sensor according to the second embodiment.
Figure 11:
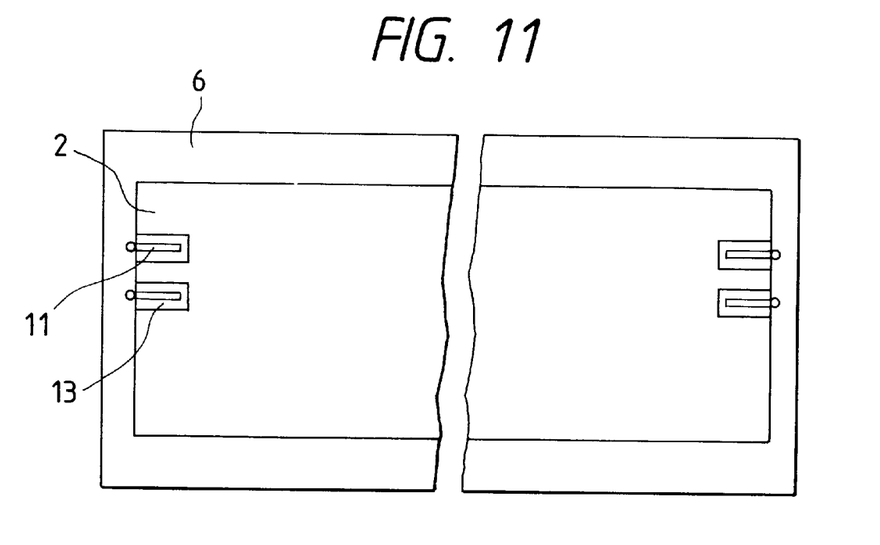
FIG. 11 is a bottom view of the image sensor according to the second embodiment.

FIGS. 10 and 11 show an image sensor according to the second embodiment of the present invention.

In this embodiment, leads 11 of LEDs 7 are bent into an almost U shape such that a second bent portion 11a from the LED 7 forms an angle of 90° or less (FIG. 10). Using the leads 11 of the LEDs 7, a sensor board 2 is inserted into a frame 6 in a snap-fitted manner. With this arrangement, the sensor board 2 can be fixed, and at the same time, electrical contact between the leads 11 of the LEDs 7 and the pads of the sensor board 2 can be obtained.

When the contact portions between the leads 11 of the LEDs 7 and the pads of the sensor board 2 are reinforced by, e.g., forming gaps as described above or soldering, fixing of the sensor board 2 and electrical contact between the leads 11 and the pads of the sensor board 2 can be more reliably achieved.

The third embodiment in which the present invention is applied to an image sensor corresponding to color image read processing will be described below. Generally, to read a color image, light sources of three colors, i.e., red (R), green (G), and blue (B) are used to illuminate an original while sequentially turning on these three color light sources. Light information of three colors, i.e., R, G, and B obtained from the original is formed into an image on a sensor IC through a lens array and converted into an electric signal by the sensor IC, thereby obtaining a color image signal.

Figure 12:
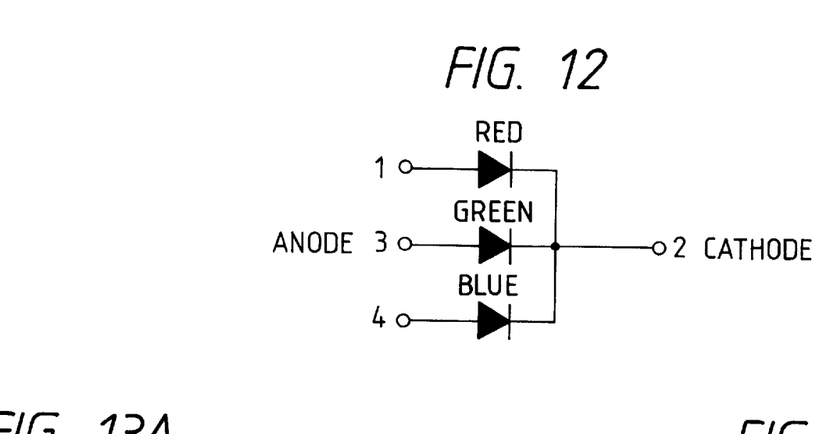
FIG. 12 is an equivalent circuit diagram of an illumination section according to the third embodiment.

FIG. 12 is an equivalent circuit diagram of such a color LED light source. As shown in FIG. 12, the color LED light source is constituted by a common cathode and anodes which are independently arranged in units of LEDs.

Figure 13A:
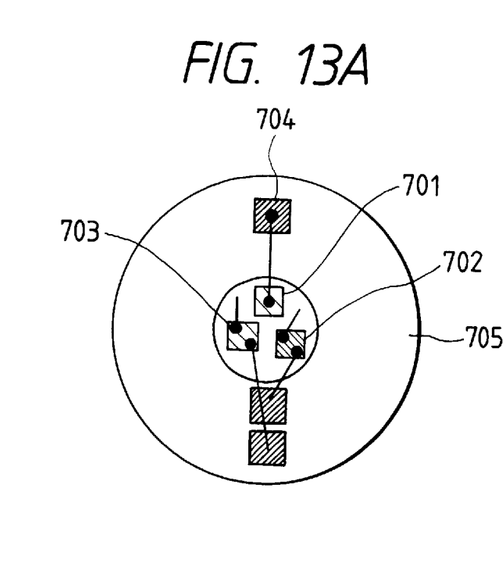
FIGS. 13A and 13B are sectional and side views, respectively, showing the illumination section according to the third embodiment.
Figure 13B:
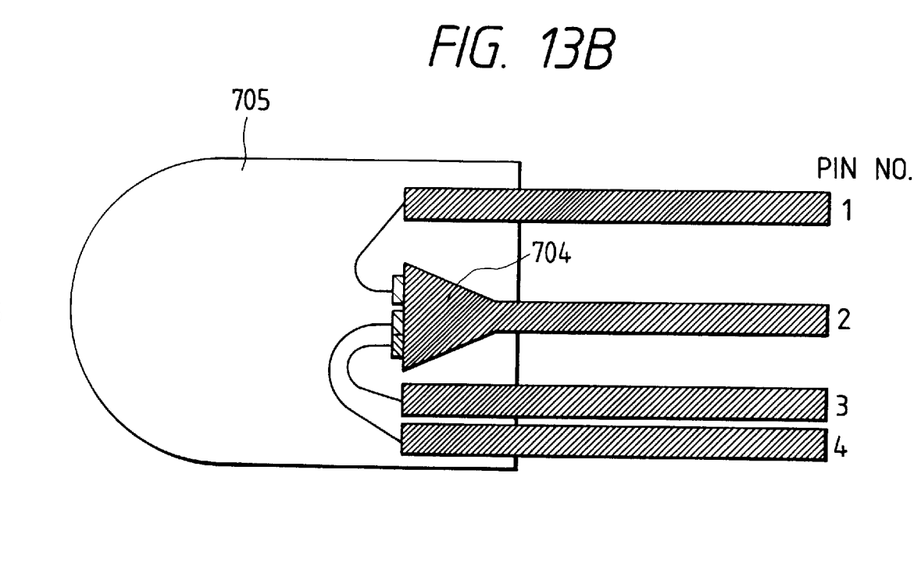

In this embodiment, a light source as shown in FIGS. 13A and 13B is used as a light source for emitting three color, i.e., R, G, and B light components. FIGS. 13A and 13B are sectional and side views, respectively, showing a shell type color LED light source. This LED light source is constituted by an R-LED device 701 for emitting red light, a G-LED device 702 for emitting green light, and a B-LED device 703 for emitting blue light. The cathodes of these three color LED devices are connected to the common base pin of a lead frame 704. The anodes of the LED devices are connected to the pins of the lead frame 704, which are dedicated for the respective colors. This structure is encapsulated with a shell-like transparent resin 705. In this color LED light source, four lead pins 11 of LEDs 7 are directly connected to a sensor board 2 by, e.g., soldering to fix the sensor board 2, as in the above-described monochromatic LED light source. Since the color LED light source has four lead pins, the sensor board 2 can be more reliably positioned and fixed.

Figure 14A:
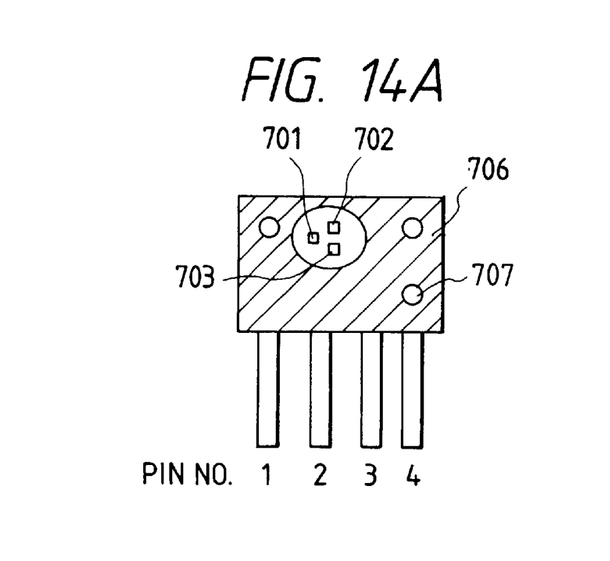
FIGS. 14A and 14B are sectional and side views, respectively, showing an illumination section according to the fourth embodiment.
Figure 14B:
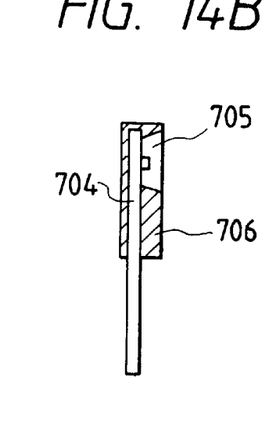

As another color LED light source corresponding to color image read processing, a case-molded LED light source as shown in FIGS. 14A and 14B will be described. FIGS. 14A and 14B are plan and sectional views, respectively, showing the case-molded color LED light source. A method of manufacturing this LED light source will be described. A lead frame 704 is inserted into a mold and then injection-molded, thereby covering the lead frame 704, except an LED device mounting portion, with a white resin 706 having a high light reflection efficiency. Subsequently, the cathodes of three color LED devices, i.e., an R-LED device 701, a G-LED device 702, and a B-LED device 703 are connected to the common base pin of the lead frame 704, and the anodes of the LED devices are connected to the pins of the lead frame 704, which are dedicated for the respective colors. A transparent resin 705 is potted on the three color LED devices, thereby completing the LED light source.

Figure 15A:
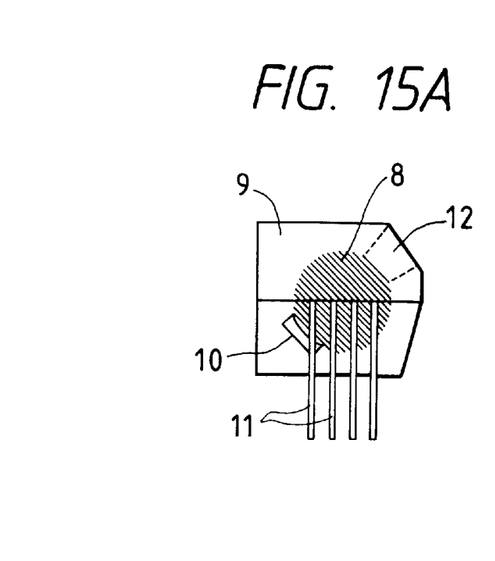
FIGS. 15A and 15B are sectional and side views, respectively, showing an illumination unit according to the fourth embodiment.
Figure 15B:
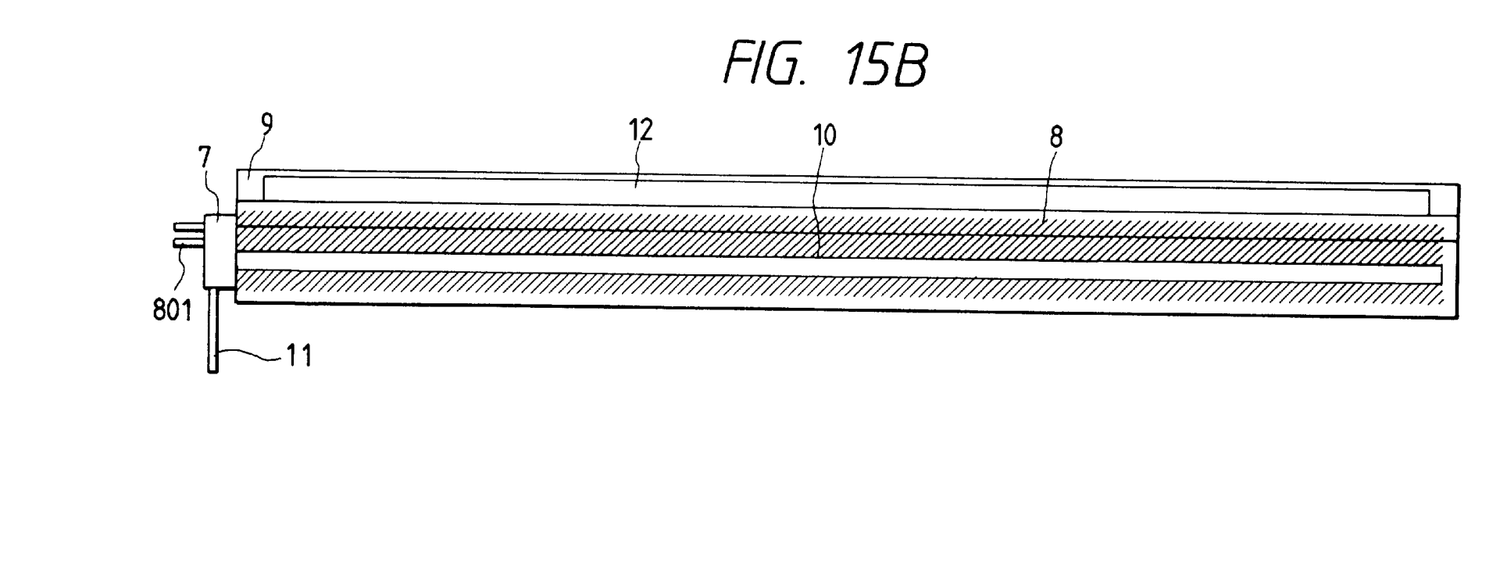
Figure 16A:
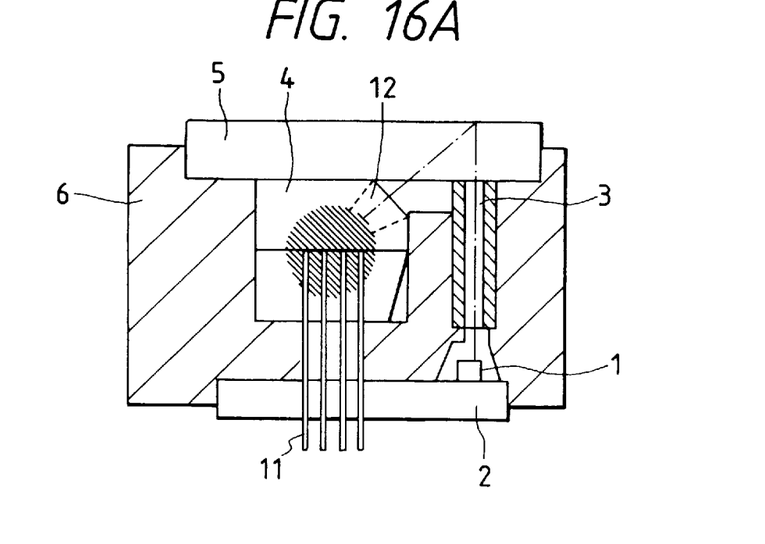
FIGS. 16A and 16B are sectional and side views, respectively, showing an image sensor according to the fourth embodiment.
Figure 16B:
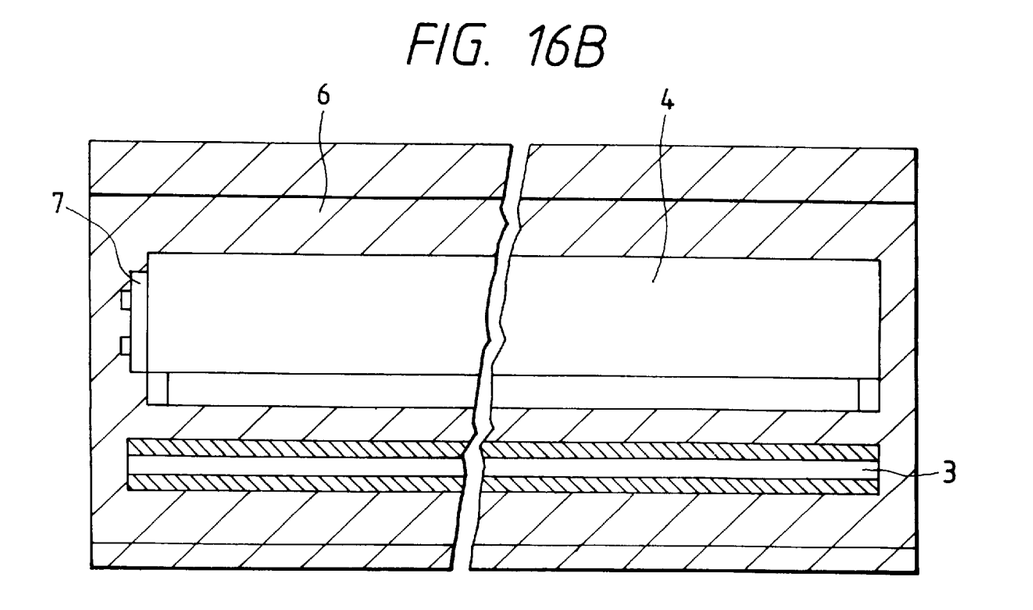

FIGS. 15A and 15B are sectional and side views, respectively, showing an illumination unit 4 to which the case-molded color LED light source is attached. FIGS. 16A and 16B are sectional and side views, respectively, showing an image sensor in which this illumination unit is mounted. The arrangement is basically the same as that using the shell type LED light source. In this case, however, positioning pins 801 are inserted into positioning holes 707 of a light guide 8 and thermally or ultrasonically caulked. With this arrangement, the light source can be properly positioned and fixed. In addition, by directly connecting four lead pins 11 of LEDs 7 to a sensor board 2 by, e.g., soldering, the sensor board 2 can be reliably fixed.

In each of the above embodiments, the present invention can be effectively applied to an image sensor using a reduction lens system.

As has been described above, the following effects can particularly be obtained by directly connecting the electrical connection lines of the light source to the sensor board:

(1) The connector cables for the light source can be omitted, and the image sensor and the external system can be electrically connected through one connector. By simplifying the electrical connection, the influence of noise can be minimized.

(2) A luminance adjusting circuit for the light source is arranged on the sensor board. With this arrangement, variations in sensor outputs ("bright" sensor outputs) in reading a white original can be effectively suppressed.

(3) By bending the electrical connection lines of the light source into an almost U shape, the sensor board can be fixed, and at the same time, electrical contact between the leads of the LEDs and the pads of the sensor board can be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:
   (a) a light source for irradiating a target object;
   (b) a sensor IC having a photoelectric conversion device for converting light information from said target object irradiated by said light source into an image signal;
   (c) a sensor board separated from said light source and mounted with said sensor IC;
   (d) a frame which incorporates said light source; and
   (e) fixing means arranged on said sensor board for fixing a lead member from said light source and sensor board.

2. A apparatus according to claim 1, wherein said fixing means further fixes said sensor board to said frame.

3. An apparatus according to claim 1, further comprising connection means for electrically connecting said lead member and said sensor board.

4. An apparatus according to claim 3, wherein said connection means electrically connects said lead member to a surface of said sensor board other than a surface of said sensor board on which said sensor IC is mounted.

5. An apparatus according to claim 3, wherein said light source is fixed by electrically connecting said lead member and said sensor board by said connection means.

6. An apparatus according to claim 1, wherein said fixing means is constituted by bending said lead member.

7. An apparatus according to claim 1, wherein said sensor board has a gap capable of receiving said lead member, and said lead member and said board are fixed by said fixing means while said lead member is inserted into the gap.

8. An apparatus according to claim 1, wherein said sensor board has a through hole capable of receiving said lead member, and said lead member and said board are fixed by said fixing means while said lead member is inserted into the through hole.

9. An apparatus according to claim 1, further comprising a plurality of lead members extending from said light source, and wherein said fixing means fixes all said lead members to said sensor board.

10. An apparatus according to claim 9, wherein said light source has a plurality of different emission wavelengths.

11. An apparatus according to claim 1, further comprising a lens for forming, on said sensor IC, an image of the light information from said target object irradiated by said light source.

12. An apparatus according to claim 1, further comprising light guide means for guiding light from said light source to irradiate said target object.

13. An apparatus according to claim 12, further comprising reflection means for irradiating the light guided by said light guide means in a predetermined direction.

14. An apparatus according to claim 13, wherein said reflection means has a stepped diffusion surface.

15. An apparatus according to claim 12, wherein said light guide means is covered by a housing of white color, said housing including an opening to illuminate said target object.

16. An apparatus according to claim 1, wherein said light source is a LED.

17. An apparatus according to claim 16, wherein said light source includes a plurality of LEDs each emitting light of a different color.

18. An apparatus according to claim 17, wherein said light source has a plurality of lead members, said plurality of lead members being arranged substantially in parallel to each other.

19. An apparatus according to claim 18, wherein said light source has four lead members.

20. An apparatus according to claim 19, wherein said four lead members include a common cathode and three anodes.

21. An apparatus according to claim 16, wherein said LED and said lead member are electrically connected to each other by a wire.

22. An apparatus according to claim 1, wherein said light source has a plurality of lead members, said plurality of lead members being arranged substantially in parallel to each other.

23. An apparatus according to claim 22, wherein said light source has four lead members.

24. An apparatus according to claim 23, wherein said four lead members include a common cathode and three anodes.

25. An apparatus according to claim 1, wherein said fixing means fixes said lead member and said sensor board by solder.

26. An apparatus according to claim 1, wherein said light source is passivated with a light transmittable resin.

27. An apparatus according to claim 1, wherein said light source includes a white resin.

28. An apparatus according to claim 1, further comprising a lens array for forming an optical image of said target object onto said sensor IC.

29. An apparatus according to claim 1, wherein said light source is arranged at both end sides of said sensor board.

30. An image reading apparatus comprising:
   (a) a light source for irradiating a target object;
   (b) a sensor IC having a photoelectric conversion device for converting light information from said target object irradiated by said light source into an image signal;
   (c) a sensor board separated from said light source and mounted with said sensor IC;

(d) a frame which incorporates said light source; and (e) fixing means for fixing a lead member from said light source to said sensor board; and (f) connection means for electrically connecting said lead member and said sensor board.

31. An apparatus according to claim 30, wherein said fixing means further fixes said sensor board to said frame.

32. An apparatus according to claim 30, wherein said fixing means is constituted by bending said lead member.

33. An apparatus according to claim 30, wherein said sensor board has a gap capable of receiving said lead member, and said lead member and said board are fixed by said fixing means while said lead member is inserted into the gap.

34. An apparatus according to claim 30, wherein said sensor board has a through hole capable of receiving said lead member, and said lead member and said board are fixed by said fixing means while said lead member is inserted into the through hole.

35. An apparatus according to claim 30, further comprising a plurality of lead members extending from said light source, and wherein said fixing means fixes all said lead members to said sensor board.

36. An apparatus according to claim 35, wherein said light source has a plurality of different emission wavelengths.

37. An apparatus according to claim 30, further comprising a lens for forming, on said sensor IC, an image of the light information from said target object irradiated by said light source.

38. An apparatus according to claim 30, further comprising light guide means for guiding light from said light source to irradiate said target object.

39. An apparatus according to claim 38, further comprising reflection means for irradiating the light guided by said light guide means in a predetermined direction.

40. An apparatus according to claim 39, wherein said reflection means has a stepped diffusion surface.

41. An apparatus according to claim 38, wherein said light guide means is covered by a housing of white color, said housing including an opening to illuminate said target object.

42. An apparatus according to claim 30, wherein said light source is a LED.

43. An apparatus according to claim 42, wherein said light source includes a plurality of LEDs each emitting light of a different color.

44. An apparatus according to claim 43, wherein said light source has a plurality of lead members, said plurality of lead members being arranged substantially in parallel to each other.

45. An apparatus according to claim 44, wherein said light source has four lead members.

46. An apparatus according to claim 45, wherein said four lead members include a common cathode and three anodes.

47. An apparatus according to claim 42, wherein said LED and said lead member are electrically connected to each other by a wire.

48. An apparatus according to claim 30, wherein said light source has a plurality of lead members, said plurality of lead members being arranged substantially in parallel to each other.

49. An apparatus according to claim 48, wherein said light source has four lead members.

50. An apparatus according to claim 49, wherein said four lead members include a common cathode and three anodes.

51. An apparatus according to claim 30, wherein said fixing means fixes said lead member and said sensor board by solder.

52. An apparatus according to claim 30, wherein said light source is passivated with a light transmittable resin.

53. An apparatus according to claim 30, wherein said light source includes a white resin.

54. An apparatus according to claim 30, wherein said connection means electrically connects said lead member to a surface of said sensor board other than a surface of said sensor board on which said sensor IC is mounted.

55. An apparatus according to claim 30, wherein said light source is fixed by electrically connecting said lead member and said sensor board by said connection means.

56. An apparatus according to claim 30, further comprising a lens array for forming an optical image of said target object onto said sensor IC.

57. An apparatus according to claim 30, wherein said light source is arranged at both end sides of said sensor board.

58. An image reading apparatus comprising:

(a) a light source for irradiating a target object;

(b) a sensor IC having a photoelectric conversion device for converting light information from said target object irradiated by said light source into an image signal;

(c) a sensor board separated from said light source and mounted with said sensor IC;

(d) a frame which incorporates said light source; and (e) fixing means for fixing a lead member from said light source to said sensor board, said fixing means is constituted by bending said lead member.

59. An apparatus according to claim 58, wherein said fixing means further fixes said sensor board to said frame.

60. An apparatus according to claim 58, further comprising connection means for electrically connecting said lead member and said sensor board.

61. An apparatus according to claim 60, wherein said connection means electrically connects said lead member to a surface of said sensor board other than a surface of said sensor board on which said sensor IC is mounted.

62. An apparatus according to claim 60, wherein said light source is fixed by electrically connecting said lead member and said sensor board by said connection means.

63. An apparatus according to claim 58, further comprising a plurality of lead members extending from said light source, and wherein said fixing means fixes all said lead members to said sensor board.

64. An apparatus according to claim 63, wherein said light source has a plurality of different emission wavelengths.

65. An apparatus according to claim 58, further comprising a lens for forming, on said sensor IC, an image of the light information from said target object irradiated by said light source.

66. An apparatus according to claim 58, further comprising light guide means for guiding light from said light source to irradiate said target object.

67. An apparatus according to claim 66, further comprising reflection means for irradiating the light guided by said light guide means in a predetermined direction.

68. An apparatus according to claim 67, wherein said reflection means has a stepped diffusion surface.

69. An apparatus according to claim 66, wherein said light guide means is covered by a housing of white color, said housing including an opening to illuminate said target object.

70. An apparatus according to claim 58, wherein said light source is a LED.

71. An apparatus according to claim 70, wherein said light source includes a plurality of LEDs each emitting light of a different color.

72. An apparatus according to claim 71, wherein said light source has a plurality of lead members, said plurality of lead members being arranged substantially in parallel to each other.

73. An apparatus according to claim 72, wherein said light source has four lead members.

74. An apparatus according to claim 73, wherein said four lead members include a common cathode and three anodes.

75. An apparatus according to claim 70, wherein said LED and said lead member are electrically connected to each other by a wire.

76. An apparatus according to claim 58, wherein said light source has a plurality of lead members, said plurality of lead members being arranged substantially in parallel to each other.

77. An apparatus according to claim 76, wherein said light source has four lead members.

78. An apparatus according to claim 77, wherein said four lead members include a common cathode and three anodes.

79. An apparatus according to claim 58, wherein said fixing means fixes said lead member and said sensor board by solder.

80. An apparatus according to claim 58, wherein said light source is passivated with a light transmittable resin.

81. An apparatus according to claim 58, wherein said light source includes a white resin.

82. An apparatus according to claim 58, further comprising a lens array for forming an optical image of said target object onto said sensor IC.

83. An apparatus according to claim 58, wherein said light source is arranged at both end sides of said sensor board.

84. An image reading apparatus comprising:
(a) a light source for irradiating a target object;
(b) a sensor IC having a photoelectric conversion device for converting light information from said target object irradiated by said light source into an image signal;
(c) a sensor board separated from said light source and mounted with said sensor IC;
(d) a frame which incorporates said light source; and
(e) fixing means for fixing a lead member from said light source to said sensor board, wherein said sensor board has a gap capable of receiving said lead member, and said lead member and said board are fixed by said fixing means in a state that said lead member is inserted into the gap.

85. An apparatus according to claim 84, wherein said fixing means further fixes said sensor board to said frame.

86. An apparatus according to claim 84, further comprising connection means for electrically connecting said lead member and said sensor board.

87. An apparatus according to claim 86, wherein said connection means electrically connects said lead member to a surface of said sensor board other than a surface of said sensor board on which said sensor IC is mounted.

88. An apparatus according to claim 86, wherein said light source is fixed by electrically connecting said lead member and said sensor board by said connection means.

89. An apparatus according to claim 84, further comprising a plurality of lead members extending from said light source, and wherein said fixing means fixes all said lead members to said sensor board.

90. An apparatus according to claim 89, wherein said light source has a plurality of different emission wavelengths.

91. An apparatus according to claim 84, further comprising a lens for forming, on said sensor IC, an image of the light information from said target object irradiated by said light source.

92. An apparatus according to claim 84, further comprising light guide means for guiding light from said light source to irradiate said target object.

93. An apparatus according to claim 92, further comprising reflection means for irradiating the light guided by said light guide means in a predetermined direction.

94. An apparatus according to claim 93, wherein said reflection means has a stepped diffusion surface.

95. An apparatus according to claim 92, wherein said light guide means is covered by a housing of white color, said housing including an opening to illuminate said target object.

96. An apparatus according to claim 84, wherein said light source is a LED.

97. An apparatus according to claim 96, wherein said light source includes a plurality of LEDs each emitting light of a different color.

98. An apparatus according to claim 97, wherein said light source has a plurality of lead members, said plurality of lead members being arranged substantially in parallel to each other.

99. An apparatus according to claim 98, wherein said light source has four lead members.

100. An apparatus according to claim 99, wherein said four lead members include a common cathode and three anodes.

101. An apparatus according to claim 96, wherein said LED and said lead member are electrically connected to each other by a wire.

102. An apparatus according to claim 84, wherein said light source has a plurality of lead members, said plurality of lead members being arranged substantially in parallel to each other.

103. An apparatus according to claim 102, wherein said light source has four lead members.

104. An apparatus according to claim 103, wherein said four lead members include a common cathode and three anodes.

105. An apparatus according to claim 84, wherein said fixing means fixes said lead member and said sensor board by solder.

106. An apparatus according to claim 84, wherein said light source is passivated with a light transmittable resin.

107. An apparatus according to claim 84, wherein said light source includes a white resin.

108. An apparatus according to claim 84, further comprising a lens array for forming an optical image of said target object onto said sensor IC.

109. An apparatus according to claim 84, wherein said light source is arranged at both end sides of said sensor board.

110. An image reading apparatus comprising:
(a) a light source for irradiating a target object;
(b) a sensor IC having a photoelectric conversion device for converting light information from said target object irradiated by said light source into an image signal;
(c) a sensor board separated from said light source and mounted with said sensor IC;
(d) a frame which incorporates said light source; and
(e) fixing means for fixing a lead member from said light source to said sensor board, wherein said sensor board has a through hole capable of receiving said lead member, and said lead member and said board are fixed by said fixing means in a state that said lead member is inserted into the through hole.

111. An apparatus according to claim 110, wherein said fixing means further fixes said sensor board to said frame.

112. An apparatus according to claim 110, further comprising connection means for electrically connecting said lead member and said sensor board.

113. An apparatus according to claim 112, wherein said connection means electrically connects said lead member to a surface of said sensor board other than a surface of said sensor board on which said sensor IC is mounted.

114. An apparatus according to claim 112, wherein said light source is fixed by electrically connecting said lead member and said sensor board by said connection means.

115. An apparatus according to claim 110, further comprising a plurality of lead members extending from said light source, and wherein said fixing means fixes all said lead members to said sensor board.

116. An apparatus according to claim 115, wherein said light source has a plurality of different emission wavelengths.

117. An apparatus according to claim 110, further comprising a lens for forming, on said sensor IC, an image of the light information from said target object irradiated by said light source.

118. An apparatus according to claim 110, further comprising light guide means for guiding light from said light source to irradiate said target object.

119. An apparatus according to claim 118, further comprising reflection means for irradiating the light guided by said light guide means in a predetermined direction.

120. An apparatus according to claim 119, wherein said reflection means has a stepped diffusion surface.

121. An apparatus according to claim 118, wherein said light guide means is covered by a housing of white color, said housing including an opening to illuminate said target object.

122. An apparatus according to claim 110, wherein said light source is a LED.

123. An apparatus according to claim 122, wherein said light source includes a plurality of LEDs each emitting light of a different color.

124. An apparatus according to claim 123, wherein said light source has a plurality of lead members, said plurality of lead members being arranged substantially in parallel to each other.

125. An apparatus according to claim 124, wherein said light source has four lead members.

126. An apparatus according to claim 125, wherein said four lead members include a common cathode and three anodes.

127. An apparatus according to claim 122, wherein said LED and said lead member are electrically connected to each other by a wire.

128. An apparatus according to claim 110, wherein said light source has a plurality of lead members, said plurality of lead members being arranged substantially in parallel to each other.

129. An apparatus according to claim 128, wherein said light source has four lead members.

130. An apparatus according to claim 129, wherein said four lead members include a common cathode and three anodes.

131. An apparatus according to claim 110, wherein said fixing means fixes said lead member and said sensor board by solder.

132. An apparatus according to claim 110, wherein said light source is passivated with a light transmittable resin.

133. An apparatus according to claim 110, wherein said light source includes a white resin.

134. An apparatus according to claim 110, further comprising a lens array for forming an optical image of said target object onto said sensor IC.

135. An apparatus according to claim 110, wherein said light source is arranged at both end sides of said sensor board.

136. An image reading apparatus comprising:
(a) a light source for irradiating a target object;
(b) a sensor IC having a photoelectric conversion device for converting light information from said target object irradiated by said light source into an image signal;
(c) a sensor board separated from said light source and mounted with said sensor IC;
(d) a frame which incorporates said light source; and
(e) connection means for electrically connecting a lead member from said light source and said sensor board.

137. An apparatus according to claim 136, wherein said light source has a plurality of different emission wavelengths.

138. An apparatus according to claim 136, further comprising a lens for forming, on said sensor IC, an image of the light information from said target object irradiated by said light source.

139. An apparatus according to claim 136, further comprising light guide means for guiding light from said light source to irradiate said target object.

140. An apparatus according to claim 139, further comprising reflection means for irradiating the light guided by said light guide means in a predetermined direction.

141. An apparatus according to claim 140, wherein said reflection means has a stepped diffusion surface.

142. An apparatus according to claim 139, wherein said light guide means is covered by a housing of white color, said housing including an opening to illuminate said target object.

143. An apparatus according to claim 136, wherein said light source is a LED.

144. An apparatus according to claim 143, wherein said light source includes a plurality of LEDs each emitting light of a different color.

145. An apparatus according to claim 144, wherein said light source has a plurality of lead members, said plurality of lead members being arranged substantially in parallel to each other.

146. An apparatus according to claim 145, wherein said light source has four lead members.

147. An apparatus according to claim 146, wherein said four lead members include a common cathode and three anodes.

148. An apparatus according to claim 143, wherein said LED and said lead member are electrically connected to each other by a wire.

149. An apparatus according to claim 136, wherein said light source has a plurality of lead members, said plurality of lead members being arranged substantially in parallel to each other.

150. An apparatus according to claim 149, wherein said light source has four lead members.

151. An apparatus according to claim 150, wherein said four lead members include a common cathode and three anodes.

152. An apparatus according to claim 136, wherein said fixing means fixes said lead member and said sensor board by solder.

153. An apparatus according to claim 136, wherein said light source is passivated with a light transmittable resin.

154. An apparatus according to claim 136, wherein said light source includes a white resin.

155. An apparatus according to claim 136, wherein said connection means electrically connects said lead member to a surface of said sensor board other than a surface of said sensor board on which said sensor IC is mounted.

156. An apparatus according to claim 136, wherein said light source is fixed by electrically connecting said lead member and said sensor board by said connection means.

157. An apparatus according to claim 136, further comprising a lens array for forming an optical image of said target object onto said sensor IC.

158. An apparatus according to claim 136, wherein said light source is arranged at both end sides of said sensor board.

159. An image reading apparatus comprising:

(a) a light guiding light source for guiding light emitted from three LEDs arranged on an end portion of said light guiding light source and illuminating an object along a longitudinal direction of said light guiding light source, said three LEDs emitting light of R, G and B respectively and said light guiding light source including reflection means for reflecting guided light into a predetermined direction;

(b) a sensor IC including a photoelectric conversion element for converting optical information from said object illuminated by said light guiding light source into an image signal;

(c) a sensor board mounted with a plurality of said sensor ICs arranged in a line and provided apart from said light guiding light source; and (d) a frame containing therein said light guiding light source and said sensor board, wherein said three LEDs arranged at the end portion of said light guiding light source have four lead members, and wherein said lead members and said sensor board are fixed by soldering said lead members to said sensor board at an end portion of said sensor board.

160. An apparatus according to claim 159, wherein said four lead members are arranged substantially in parallel to each other.

161. An apparatus according to claim 159, wherein said four lead members include a common cathode and three anodes.

162. An apparatus according to claim 159, wherein said light guiding light source is passivated with light transmittable resin.

163. An apparatus according to claim 159, wherein said light guiding light source includes a white resin.

164. An apparatus according to claim 159, wherein said light guiding light source is covered by a housing of white color, said housing including an opening to illuminate said object.

165. An apparatus according to claim 159, wherein said lead members are soldered to a surface of said sensor board other than a surface of said sensor board on which said sensor IC is mounted.

166. An apparatus according to claim 159, further comprising a lens array for forming an optical image of said object onto said sensor IC.

167. An apparatus according to claim 159, wherein said LEDs and said lead members are electrically connected by a wire.

\* \* \* \* \*

UNITED STATES PATENT AND TRADEMARK OFFICE
CERTIFICATE OF CORRECTION

PATENT NO. : 6,002,494  
DATED : December 14, 1999  
INVENTOR(S) : Masami Tabata Page 1 of 1

It is certified that error appears in the above-identified patent and that said Letters Patent is hereby corrected as shown below:

Column 5:
Line 47, "a" should read --an--.

Column 7:
Line 1, "and" should be deleted.

Column 11:
Line 15, "wave" should read --wave- --.

Signed and Sealed this

Third Day of July, 2001

*Attest:*

Nicholas P. Godici

*Attesting Officer*

NICHOLAS P. GODICI  
*Acting Director of the United States Patent and Trademark Office*